(12) United States Patent
Parker (10) Patent No.: US 11,018,621 B1
(45) Date of Patent: May 25, 2021

(54) METHODS FOR CLEANING PHOTOVOLTAIC PANELS

(71) Applicant: Posey Parker, Houston, TX (US)

(72) Inventor: Posey Parker, Houston, TX (US)

( * ) Notice: Subject to any disclaimer, the term of this patent is extended or adjusted under 35 U.S.C. 154(b) by 0 days.

(21) Appl. No.: 17/095,572

(22) Filed: Nov. 11, 2020

Related U.S. Application Data (63) Continuation of application No. 16/675,209, filed on Nov. 5, 2019, now Pat. No. 10,873,291.

(60) Provisional application No. 62/756,240, filed on Nov. 6, 2019.

(51) Int. Cl.
  *B08B 7/00* (2006.01)
  *H02S 40/10* (2014.01)
(52) U.S. Cl.
  CPC ............ *H02S 40/10* (2014.12); *B08B 7/0035* (2013.01)
(58) Field of Classification Search
  CPC ............................ H02S 40/10; B08B 7/0035
  See application file for complete search history.

(56) References Cited

U.S. PATENT DOCUMENTS

| | | | | |
|---|---|---|---|---|
| 2009/0266353 | A1* | 10/2009 | Lee .......................... | H02S 40/10 126/593 |
| 2010/0212093 | A1* | 8/2010 | Pak .......................... | F24S 50/00 15/97.1 |
| 2011/0005681 | A1* | 1/2011 | Savas ................ | H01J 37/32036 156/345.33 |
| 2011/0005682 | A1* | 1/2011 | Savas ................ | C23C 16/45504 156/345.34 |
| 2011/0006040 | A1* | 1/2011 | Savas ...................... | C23C 16/40 216/71 |
| 2011/0137458 | A1* | 6/2011 | Hisatani ..................... | B25J 5/00 700/248 |
| 2011/0283477 | A1* | 11/2011 | Ashpis .................. | H05H 1/2406 15/405 |
| 2012/0125367 | A1* | 5/2012 | Monkman ............... | F24S 40/20 134/18 |
| 2012/0152877 | A1* | 6/2012 | Tadayon .................. | F24S 25/10 212/224 |
| 2013/0047978 | A1* | 2/2013 | Slocum .................... | F24S 40/20 126/694 |
| 2013/0206173 | A1* | 8/2013 | Zijlstra ..................... | B08B 1/04 134/6 |
| 2014/0150816 | A1* | 6/2014 | Potter ..................... | F24S 40/20 134/6 |
| 2017/0070189 | A1* | 3/2017 | Hartman ................. | B08B 3/024 |
| 2019/0184544 | A1* | 6/2019 | Tadayon .................... | B25J 5/02 |

FOREIGN PATENT DOCUMENTS

WO  WO-2010126304 A2 * 11/2010 ....... H01L 31/02363

* cited by examiner

*Primary Examiner* — Alexander Markoff
(74) *Attorney, Agent, or Firm* — Elliott Law PLLC; Douglas H. Elliott; Nathan Q. Huynh (57) ABSTRACT

The disclosure herein includes one or more methods for cleaning photovoltaic panels, which includes using cleaning assemblies for photovoltaic panels that may each include: 1) a track coupled to the photovoltaic panel; 2) a housing coupled to the photovoltaic panel; 3) a drive motor coupled to the housing; 4) a drive wheel coupled to the drive motor, wherein the wheel is capable of rolling on the track; 5) a vacuum pump having a suction head coupled to the housing; and/or 6) an air pump having an ionizing electrode.

1 Claim, 6 Drawing Sheets

METHODS FOR CLEANING PHOTOVOLTAIC PANELS

CROSS REFERENCE TO RELATED APPLICATIONS

This application is a continuation of and claims benefit to pending U.S. Nonprovisional application Ser. No. 16/675,209, filed on Nov. 5, 2019, which claims benefit to U.S. Provisional Application No. 62/756,240, filed on Nov. 6, 2018; and this application hereby incorporates herein U.S. Nonprovisional application Ser. No. 16/675,209 and U.S. Provisional Application No. 62/756,240 as if set forth herein in their entireties.

BACKGROUND

1. Field of Inventions

The field of this application and any resulting patent is cleaning assemblies for photovoltaic panels.

2. Description of Related Art

Various cleaning assemblies and methods for cleaning photovoltaic panels, have been proposed and utilized. However, those methods and structures lack the combination of steps and/or features of the methods and/or structures covered by what is disclosed herein. Furthermore, it is contemplated that the methods and/or structures disclosed herein solve many of the problems that prior art methods and structures have failed to solve. Also, the methods and/or structures disclosed herein have benefits that would be surprising and unexpected to a hypothetical person of ordinary skill with knowledge of the prior art existing as of the filing date of this application.

SUMMARY

The disclosure herein includes one or more methods of cleaning photovoltaic panels, each method may include: 1) providing a cleaning assembly, which cleaning assembly may include: a) a housing disposed adjacent a surface of the photovoltaic panel for cleaning; b) a drive motor coupled to the housing; c) a first wheel coupled to the drive motor; d) a second wheel coupled to the drive motor; e) a vacuum pump having a suction head disposed in the housing; f) an air pump having a nozzle disposed in the housing; g) an ionizing electrode coupled to the air pump; h) a brush coupled to the drive motor and disposed in the housing; i) a power supply coupled to the drive motor; and j) a controller electrically coupled to the drive motor, the vacuum pump, the air pump, the ionizing electrode, and the power supply; 2) disposing the first wheel and the second wheel on the photovoltaic panel; 3) turning on the drive motor, the vacuum pump, and the air pump with the controller at a pre-determined time; 4) rolling the first wheel and the second wheel on the photovoltaic panel in a first direction with the drive motor; 5) generating a first volume of air with the air pump; 6) ionizing the first volume of air with the ionizing electrode; 7) blowing the ionized first volume of air through the nozzle against the photovoltaic panel with the air pump; 8) sucking a portion of the ionized first volume of air and debris in the housing out of the housing through the suction head with the vacuum pump; 9) rotating the brush with the drive motor; and 10) brushing the surface of the photovoltaic panel with the brush.

The disclosure herein includes one or more methods of cleaning photovoltaic panels, each method may include: 1) providing a cleaning assembly that may include: a track coupled to the panel; a housing coupled to the photovoltaic panel; a drive motor coupled to the housing; a wheel coupled to the drive motor, wherein the wheel is capable of rolling on the track; a vacuum pump having a suction head coupled to the housing; an air pump having a nozzle coupled to the housing; 2) rolling the wheel on the track in a first direction; 3) generating, with an air pump, a first volume of air; 4) ionizing, with an ionizing electrode, the first volume of air; 4) pumping, with the air pump, the ionized volume of air towards the photovoltaic panel; and 5) sucking, with the vacuum, a second volume of air.

The disclosure herein includes one or more cleaning assemblies for photovoltaic panels, which cleaning assemblies for photovoltaic panels may each include: 1) a track coupled to the photovoltaic panel; 2) a housing coupled to the photovoltaic panel; 3) a drive motor coupled to the housing; 4) a drive wheel coupled to the drive motor, wherein the wheel is capable of rolling on the track; 5) a vacuum pump having a suction head coupled to the housing; and 6) an air pump having an ionizing electrode.

The disclosure herein includes one or more cleaning assemblies for photovoltaic panels, which cleaning assemblies for photovoltaic panels may each include: 1) a track coupled to the photovoltaic panel; 2) a housing coupled to the photovoltaic panel; 3) a drive motor coupled to the housing; 4) a drive wheel coupled to the drive motor, wherein the wheel is capable of rolling on the track; 5) a vacuum pump having a suction head coupled to the housing; 6) an air pump having a nozzle coupled to the housing; and 7) a brush coupled to the motor.

The disclosure herein includes one or more cleaning assemblies for photovoltaic panels, which cleaning assemblies for photovoltaic panels may each include: 1) a track coupled to the photovoltaic panel; 2) a housing coupled to the photovoltaic panel; 3) a drive motor coupled to the housing; 4) a drive wheel coupled to the drive motor, wherein the wheel is capable of rolling on the track; 5) a vacuum pump having a suction head coupled to the housing; 6) an air pump having a nozzle coupled to the housing; and 7) a sensor coupled to the housing.

The disclosure herein includes one or more cleaning assemblies for photovoltaic panels, which cleaning assemblies for photovoltaic panels may each include: 1) a track coupled to the photovoltaic panel; 2) a housing coupled to the photovoltaic panel; 3) a drive motor coupled to the housing; 4) a drive wheel coupled to the drive motor, wherein the wheel is capable of rolling on the track; 5) a vacuum pump having a suction head coupled to the housing; 6) an air pump having a nozzle coupled to the housing; 7) recharge photovoltaic panel coupled to the housing; and 8) a power supply electrically coupled to the second photovoltaic panel.

DETAILED DESCRIPTION

1. Introduction

A detailed description will now be provided. The purpose of this detailed description, which includes the drawings, is to satisfy the statutory requirements of 35 U.S.C. § 112. For example, the detailed description includes a description of the inventions disclosed herein and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are not all necessarily drawn to scale, nor do they show all the structural details of the systems, nor do they limit the scope of the disclosure herein.

2. Selected Definitions

Certain terms as used herein are expressly defined below.

The term "air pump" as used herein is defined as a device capable of moving or flowing a volume of air. An air pump may include a housing, motor, and blades. The blades of an air pump may be fins forming a turbine. Also, a housing of an air pump may have a fan aperture. An actuated motor of an air pump may turn blades coupled thereto to cause air flow within a fan aperture. In addition, an ionizing electrode may be disposed in a fan aperture of an air pump. Furthermore, an air pump may include a pump conduit and a nozzle. The nozzle of an air pump may be a tubular. The nozzle of an air pump may have apertures disposed therethrough. A volume of air pumped in an air pump may flow through a fan aperture, a pump conduit, and a nozzle of the fan. An air pump may have a housing, a pump conduit, and a nozzle made of non-conductive material, e.g., polymers, rubber, plastic, silicone, or ceramic. An air pump may have a housing, a pump conduit, and a nozzle having apertures lined with non-conductive material, e.g., polymers, rubber, plastic, silicone, or ceramic.

The term "aligning" as used herein is a verb that means manufacturing, forming, adjusting, or arranging one or more physical objects into a particular position. After any aligning takes place, the objects may be fully or partially "aligned." Aligning preferably involves arranging a structure or surface of a structure in linear relation to another structure or surface; for example, such that their borders or perimeters may share a set of parallel tangential lines. In certain instances, the aligned borders or perimeters may share a similar profile. Additionally, apertures may be aligned, such that a structure or portion of a structure may be extended into and/or through the apertures.

The term "aperture" as used herein is defined as any opening in a solid object or structure, e.g., garment. For example, an aperture may be an opening that begins on one side of a solid object and ends on the other side of the object. An aperture may alternatively be an opening that does not pass entirely through an object, but only partially passes through, e.g., as a groove. An aperture can be an opening in an object, e.g., housing, suction head, nozzle, conduit, or tubular, that is completely circumscribed, defined, or delimited by the object itself. Alternatively, an aperture can be an opening formed when one object is combined with one or more other objects or structures. An aperture may receive an object, e.g., pin or threaded assembly.

The term "assembly" as used herein is defined as any set of components that have been fully or partially assembled together. A group of assemblies may be coupled to form a solid housing having an inner surface and an outer surface.

The term "broadcast" as used herein is defined as a verb to transmit a radio signal over airwaves for public reception.

The term "clamp" as used herein is defined as an assembly capable of being removably coupled to another object using pressure. Parts of a clamp may be pressed against a portion of a housing, a photovoltaic panel, or a support stand. A clamp is capable of being removably coupled to a portion of a housing, a photovoltaic panel, or a support stand. A clamp may have a first portion and a second portion. Each portion of a clamp may be molded or carved from a single piece of material, e.g., plastic, carbon fiber, metal, or wood. Further, a clamp may include one or more threaded assemblies. Each portion of a clamp may have the shape of a block-letter "C." A clamp may have a portion threadably coupled to a thumb screw. A clamp may include one or more apertures disposed laterally therethrough. A clamp may be a G-clamp, a C-clamp, a clip, a latch, a hook, fasteners, or a lock.

The term "conduit" as used herein is defined as a structure on or through which fluid may be flowed. Types of conduit may include a hose, a pipe, a tubular, and a syringe.

The term "controller" as used herein is defined as an electronic device for processing one or more electrical signals. Processing an electrical signal may include querying, parsing, sorting, calculating, storing, translating, modulating, and/or demodulating the electrical signal and/or data related to the electrical signal. A controller may receive and/or transmit electrical signals. Examples of controllers may include an option card and a central processing unit ("CPU"). A controller may be a component of a cleaning assembly. A controller may be a component of a computer system.

The term "coupled" as used herein is defined as directly or indirectly connected or attached. A first object may be coupled to a second object such that the first object is positioned at a specific location and orientation with respect to the second object. For example, a motor may be coupled to a housing. In another example, an ionizing electrode may be coupled to a housing of an air pump. A first object may be either permanently, removably, threadably, rotatably, and/or electrically coupled to a second object. Two objects may be permanently coupled to each via heated adhesive, melting. Two objects may be removably coupled to each other via compression ring, pin, adhesive, melting, tape, latches, hooks, fasteners, locks, male and female connectors, clips, clamps, and/or surface-to-surface contact. Two objects may be rotatably coupled together, e.g., where the first object may be rotated relative to the second object. Two objects may be capable of being threadably coupled, e.g., where a threaded outer surface of one object is capable of being engaged with or to a threaded inner surface of another object. Threadably coupled objects may be removably coupled. Two objects may be electrically coupled, where electricity may be conducted from one object to the other. For example, a recharge photovoltaic panel may be electrically coupled to a power supply because an electrical energy may be conducted (via a power cable) from the recharge photovoltaic panel to the power supply.

The term "cylindrical" as used herein is defined as shaped like a cylinder, e.g., having straight parallel sides and a circular or oval or elliptical cross-section. Examples of a cylindrical body or structure may include a wheel, brush, suction head, nozzle, or a tubular. A cylindrical body or structure may be completely or partially shaped like a cylinder. A cylindrical body that has an inner or an outer diameter that changes abruptly may have a radial face, rim, or "lip" extending toward or away from the center axis. Additionally, a cylindrical body may have a lip that is tapered or radiused. A cylindrical body may have an aperture that is extended through the entire length of the body to form a hollow cylinder that is capable of permitting another body, e.g., tubular, to be extended or passed through.

The term "exemplary" is used exclusively herein to mean "serving as an example, instance, or illustration." Anything, including any embodiment, structure, element, or step, described herein as exemplary, is not to be construed as preferred or advantageous over other embodiments, structures, elements, steps, etc.

The terms "first" and "second" as used herein merely differentiate two or more things or actions, and do not signify anything else, including order of importance, sequence, etc.

The term "fluid" as used herein is defined as material that is capable of being flowed. A fluid may be a liquid or a gas. Examples of a fluid may include air, water cleaning fluid, and lubricating oil. A fluid may include additional material, e.g., bird droppings, bugs, sediments, dust, water, compounds, and/or elements carried by weather phenomena. A fluid can be a mixture of two or more fluids and/or one or more materials. A fluid may absorb heat. A fluid may have properties such as viscosity, anti-foaming, thermal stability, thermal conductivity, and thermal capacity. A fluid may be water-based, oil-based, synthetic, organic, or a combination of viscous materials and solid materials.

The terms "he," "she," "they," and any other personal pronouns as used herein refer to any gender interchangeably. For example, all uses of "he" encompasses "she" as well.

The term "ionizing electrode" as used herein is defined as an electrical conductor capable of emitting electrons. An ionizing electrode may be made from various conductive materials, e.g., copper, graphite, titanium, brass, silver, gold, platinum, palladium, mixed metal oxides, and conductive polymer. Forms of an ionizing electrode may include a plate, a wire, a contact tip, a pin, a socket, a stamping, a sheet, a wheel, and a gear. An ionizing electrode may be coupled to a pump housing. An ionizing electrode may be disposed in a fan aperture of a pump housing.

The term "support stand" as used herein is defined as structure for supporting another object, e.g., photovoltaic panel.

The term "pressure" as used herein is defined as force per unit area. Pressure may be exerted against a surface of an object, e.g., photovoltaic panel, track, or housing.

The term "providing" as used herein is defined as making available, furnishing, supplying, equipping, or causing to be placed in position.

The term "radio channel" as used herein is defined as an assigned band of frequencies for radio communication. A spectrum of radio frequencies may be visualized on a number line as a set of consecutive frequencies. Thus, on a spectrum of frequencies, a set of channels may be divided by a band or interval of frequencies, e.g., 6 kHz, 12.5 kHz, or 25 kHz wide. A set of radio channels having bands of frequencies that are 12.5 kHz (kilohertz) wide is referred to as narrow-band radio channels. Furthermore, the spectrum of narrow-band radio channels may include frequencies ranging from about 30 MHz (megahertz) to approximately 500 MHz. Very High Frequency (VHF) channels may be narrow-band channels on a spectrum of frequencies from 150 MHz to 174 MHz. Ultra-High Frequency (UHF) channels may be narrow-band channels on a spectrum of frequencies from 421 MHz to 470 MHz. Two-way radio transceivers may send and/or receive signals broadcasted on narrow-band radio channels. Two-way radio transceivers may send and/or receive signals broadcasted on VHF and/or UHF channels. A first two-way radio transceiver would be capable of receiving and processing a radio signal broadcasted by a second two-way radio transceiver if the first two-way radio transceiver and the second two-way radio transceiver are tuned to receive and broadcast the radio signal on the same radio channel, respectively. A radio receiver may receive radio signals broadcasted on narrow-band channels. A radio receiver may receive radio signals broadcasted on VHF and/or UHF channels.

The term "radio receiver" as used herein is defined as a radio capable receiving a radio signal. A radio receiver may be portable, e.g., hand-held. A radio receiver tuned to the same broadcast radio channel of a two-way radio transceiver can receive and process, e.g., demodulate, broadcast radio signals from the two-way radio transceiver. A radio receiver may be coupled to a computer system via a plug. A radio receiver may include a controller capable of demodulating a radio signal to generate digital representations of a value, date, time, and/or unique identifier. A receiver may be two-way radio transceiver used to only receive and process broadcast radio signals but not broadcast radio signals.

The term "radio signal" as used herein is defined as a radio wave. A radio signal may be a waveform having a pattern representing data, e.g., digital and/or audio data. A "modulated radio signal" may be a radio wave having a waveform modified by amplitude, frequency, or phase.

The term "sensor" as used herein is an electronic device capable of emitting and receiving energy, e.g., light, radiation, heat, mechanical, sound, and/or electrical energy. A sensor may emit and/or receive infrared light.

The term "surface" as used herein is defined as any face of a structure. A surface may also refer to that flat or substantially flat area on a housing, track, photovoltaic panel, and/or a support stand. A surface may have irregular contours. A surface may be formed from coupled components, e.g. housing, track, and wheel. Coupled components may form irregular surfaces.

The term "threads" as used herein is defined as one or more helical protrusions or grooves on a surface of a cylindrical object. Each full rotation of a protrusion or groove around a threaded surface of the object is referred to herein as a single "thread." Each full rotation of a protrusion or groove around a threaded surface of the object is referred to herein as a single "thread." Threads formed on an inner surface of an object, e.g., housing or motor, may be referred to as box threads or female threads. Threads formed on an outer surface of an object, e.g., screw or bolt, may be referred to as pin threads or male threads. The term "threaded" as used herein is defined as having threads.

The term "threaded assembly" as used herein refers to an assembly that includes threads, and preferably also includes one or more nuts, one or more bolts, one or more washers, and/or one or more spacers used for coupling two objects together. A nut, a washer, and a spacer may, for example, share a common central axis line. A threaded assembly may include a "threaded portion" wherein a section of the threaded assembly includes threads, e.g., pin threads or box threads. A threaded portion may have a diameter sized to extend through an aperture of a backplane, tubular, base, or clamp. In certain cases, a threaded portion of a first object may be removably coupled to a threaded portion of a second object. A threaded assembly may be turned clockwise. A threaded assembly may be turned counterclockwise. A threaded assembly may be threadably extended through a clamp. A threaded assembly may be abutted against a surface of a housing. A threaded assembly may be threadably retracted through a housing.

The term "track" as used herein refers to any solid or semi-solid structure. A track may define a path of movement of an object, e.g., wheel. A track may be molded or carved from a single piece of material, e.g., plastic, carbon fiber, fiberglass, ceramic, metal, or wood. A track may be coupled to a photovoltaic panel. A track may be aligned with a plane of a photovoltaic panel. A track may be a cylindrical, polygonal, and/or irregular structure, or a tubular structure, rod, polygonal cube, or one or more walls having irregular contours. However, a track may alternatively be formed from multiple smaller, interconnected subunits, e.g., tracks. A track may have a portion having a corrugated e.g., undulating or sinusoidal, surface.

The term "translate" as used herein is defined as a verb to express or represent a word, number, or expression in another form or language. For example, a controller of a two-way radio transceiver may translate an electrical signal by expressing the number 0 or 1. Furthermore, the controller may express or digitally represent the value as a binary value, e.g., 000000001. A controller of a two-way radio transceiver may be capable of translating a value or its digital representation by expressing the value as a radio wave. Conversely, a controller of a two-way radio transceiver may be capable of translating a portion of a radio wave to a value or its digital representation. Also, a controller of a radio receiver may be capable of translating a portion of a radio wave to a value or its digital representation.

The term "two-way radio transceiver" as used herein is defined as a radio capable transmitting and/or receiving a radio signal. A two-way radio transceiver may be portable, e.g., hand-held. Two-way radio transceivers tuned to the same radio channel, e.g., frequency band, can receive and process, e.g., demodulate, broadcast radio signals from each other. A two-way radio transceiver may be coupled to a conductive conduit via a plug. A two-way radio transceiver may include a controller capable of translating electrical signals into a digital representation of value, e.g. 0, 1, 2, 3, 4, 5, 6, 7, 8, or 9. A two-way radio transceiver may include a controller capable of causing the two-way radio transceiver to generate a radio signal modulated to include digital representations of a value, date, time, and/or unique identifier. A two-way radio transceiver may include a controller capable of demodulating a radio signal to generate digital representations of a value.

The term "vacuum pump" as used herein is an air pump for sucking air and/or particles.

The term "value" as used herein is defined as a number, a letter, a word, a character, a symbol, and/or an expression. A value may be a number, e.g., 0, 1, 2, 3, 4, 5, 6, 7, 8, and 9. A value may a letter of an alphabet, e.g., A, B, C, and D. A value may be a combination of values. A value may be a time, day, date, month, and/or year. A value may be a unique identifier having letters, numbers, and/or characters.

The term "tubular" as used herein is defined as a structure having an inner surface and an outer surface. A tubular may have an aperture disposed therethrough. Preferably, a tubular is cylindrical. Examples of a tubular may include a vacuum conduit, suction head, pump conduit, and nozzle. However, any or all tubulars of an assembly may have polygonal cross-sections, e.g., triangular, rectangular, pentagonal, hexagonal, or octagonal.

The term "unitary" as used herein is defined as having the nature, properties, or characteristics of a single unit. For example, a flat portion and a block portion that are individual parts of a housing may be unitary in the sense they are not separate but rather are formed from a single piece of conductive material, e.g., polymer, plastic, carbon fiber, ceramic, or metal.

The terms "upper," "lower," "top," "bottom" as used herein are relative terms describing the position of one object, thing, or point positioned in its intended useful position, relative to some other object, thing, or point also positioned in its intended useful position, when the objects, things, or points are compared to distance from the center of the earth. The term "upper" identifies any object or part of a particular object that is farther away from the center of the earth than some other object or part of that particular object, when the objects are positioned in their intended useful positions. The term "lower" identifies any object or part of a particular object that is closer to the center of the earth than some other object or part of that particular object, when the objects are positioned in their intended useful positions.

The term "wheel" as used herein is defined any cylindrical structure. A wheel may have an aperture disposed therethrough. A wheel may have a central aperture defining a continuous inner wall. A wheel may be rotatably connected to a motor or a housing. A wheel may be capable of being rolled on a photovoltaic panel, a surface of a track, or an edge of a track. A wheel may be a gear. A wheel may have teeth, e.g., for meshing with a corrugated surface of a track.

3. Certain Specific Embodiments

The disclosure herein includes one or more methods of cleaning photovoltaic panels, each method may include: 1) providing a cleaning assembly, which cleaning assembly may include: a) a housing disposed adjacent a surface of the photovoltaic panel for cleaning; b) a drive motor coupled to the housing; c) a first wheel coupled to the drive motor; d) a second wheel coupled to the drive motor; e) a vacuum pump having a suction head disposed in the housing; f) an air pump having a nozzle disposed in the housing; g) an ionizing electrode coupled to the air pump; h) a brush coupled to the drive motor and disposed in the housing; i) a power supply coupled to the drive motor; and j) a controller electrically coupled to the drive motor, the vacuum pump, the air pump, the ionizing electrode, and the power supply; 2) disposing the first wheel and the second wheel on the photovoltaic panel; 3) turning on the drive motor, the vacuum pump, and the air pump with the controller at a pre-determined time; 4) rolling the first wheel and the second wheel on the photovoltaic panel in a first direction with the drive motor; 5) generating a first volume of air with the air pump; 6) ionizing the first volume of air with the ionizing electrode; 7) blowing the ionized first volume of air through the nozzle against the photovoltaic panel with the air pump; 8) sucking a portion of the ionized first volume of air and debris in the housing out of the housing through the suction head with the vacuum pump; 9) rotating the brush with the drive motor; and 10) brushing the surface of the photovoltaic panel with the brush.

The disclosure herein includes one or more methods of cleaning a solar panel, each method may include: 1) providing a cleaning assembly that may include: a track coupled to the panel; a housing coupled to the photovoltaic panel; a drive motor coupled to the housing; a wheel coupled to the drive motor, wherein the wheel is capable of rolling on the track; a vacuum pump having a suction head coupled to the housing; an air pump having a nozzle coupled to the housing; 2) rolling the wheel on the track in a first direction; 3) generating, with an air pump, a first volume of air; 4) ionizing, with an ionizing electrode, the first volume of air; 4) pumping, with blades of the air pump, the ionized volume of air towards the photovoltaic panel; and 5) sucking, with the vacuum, a second volume of air.

The disclosure herein includes one or more cleaning assemblies for photovoltaic panels, which cleaning assemblies for photovoltaic panels may each include: 1) a track coupled to the photovoltaic panel; 2) a housing coupled to the photovoltaic panel; 3) a drive motor coupled to the housing; 4) a drive wheel coupled to the drive motor, wherein the wheel is capable of rolling on the track; 5) a vacuum pump having a suction head coupled to the housing; and 6) an air pump having an ionizing electrode.

The disclosure herein includes one or more cleaning assemblies for photovoltaic panels, which cleaning assemblies for photovoltaic panels may each include: 1) a track coupled to the photovoltaic panel; 2) a housing coupled to the photovoltaic panel; 3) a drive motor coupled to the housing; 4) a drive wheel coupled to the drive motor, wherein the wheel is capable of rolling on the track; 5) a vacuum pump having a suction head coupled to the housing; 6) an air pump having a nozzle coupled to the housing; and 7) a brush coupled to the motor.

The disclosure herein includes one or more cleaning assemblies for photovoltaic panels, which cleaning assemblies for photovoltaic panels may each include: 1) a track coupled to the photovoltaic panel; 2) a housing coupled to the photovoltaic panel; 3) a drive motor coupled to the housing; 4) a drive wheel coupled to the drive motor, wherein the wheel is capable of rolling on the track; 5) a vacuum pump having a suction head coupled to the housing; 6) an air pump having a nozzle coupled to the housing; and 7) a sensor coupled to the housing.

The disclosure herein includes one or more cleaning assemblies for photovoltaic panels, which cleaning assemblies for photovoltaic panels may each include: 1) a track coupled to the photovoltaic panel; 2) a housing coupled to the photovoltaic panel; 3) a drive motor coupled to the housing; 4) a drive wheel coupled to the drive motor, wherein the wheel is capable of rolling on the track; 5) a vacuum pump having a suction head coupled to the housing; 6) an air pump having a nozzle coupled to the housing; 7) recharge photovoltaic panel coupled to the housing; and 8) a power supply electrically coupled to the second photovoltaic panel.

In any one of the methods or structures disclosed herein, the track may have a corrugated surface.

In any one of the methods or structures disclosed herein, the track may be coupled to an edge of the photovoltaic panel.

In any one of the methods or structures disclosed herein, the housing may be disposed above the motor.

In any one of the methods or structures disclosed herein, the housing may be disposed above the vacuum.

In any one of the methods or structures disclosed herein, the housing may be disposed above the air pump.

In any one of the methods or structures disclosed herein, the housing may be disposed above the brush.

In any one of the methods or structures disclosed herein, the cleaning assembly may further include a second photovoltaic panel coupled to the housing.

In any one of the methods or structures disclosed herein, the cleaning assembly may further include a second photovoltaic panel coupled to the power supply.

In any one of the methods or structures disclosed herein, the drive wheel may be a gear.

Any one of the methods or structures disclosed herein may further include a guide wheel coupled to the housing.

Any one of the methods or structures disclosed herein may further include a support wheel coupled to the housing.

Any one of the methods or structures disclosed herein may further include a support wheel, the drive wheel may be coupled to a first end of the housing and the support wheel may be coupled to a second end of the housing.

In any one of the methods or structures disclosed herein, the vacuum may be coupled to the photovoltaic panel.

In any one of the methods or structures disclosed herein, the vacuum may be electrically coupled to the power supply.

In any one of the methods or structures disclosed herein, the vacuum may include: 1) a vacuum housing; 2) a vacuum motor disposed in the vacuum housing; 3) a vacuum conduit fluidically coupled to the vacuum housing and the suction head.

In any one of the methods or structures disclosed herein, the air pump may be coupled to the photovoltaic panel.

In any one of the methods or structures disclosed herein, the air pump may be electrically coupled to the power supply.

In any one of the methods or structures disclosed herein, the air pump may include: 1) a pump housing; 2) a pump motor disposed in the pump housing; 3) a pump conduit coupled to the pump housing and the nozzle.

Any one of the methods or structures disclosed herein may further include a recharge photovoltaic panel coupled to the housing.

Any one of the methods or structures disclosed herein may further include a recharge photovoltaic panel electrically coupled to the power supply.

In any one of the methods or structures disclosed herein, the housing may be disposed above the motor.

In any one of the methods or structures disclosed herein, the housing may be disposed above the vacuum.

In any one of the methods or structures disclosed herein, the housing may be disposed above the nozzle of the air pump.

Any one of the methods or structures disclosed herein may further include a sensor coupled to the power supply.

Any one of the methods or structures disclosed herein may further include a controller coupled to the power supply.

In any one of the methods or structures disclosed herein, the wheel may be a gear.

In any one of the methods or structures disclosed herein, the ionizing electrode may be electrically coupled to the power supply.

Any one of the methods disclosed herein may further include: 1) turning, with the motor, a brush, wherein the brush has bristles capable of physical contact with the photovoltaic panel.

Any one of the methods disclosed herein may further include: 1) rolling the wheel in second direction; and 2) scanning, with a sensor, a surface of the photovoltaic panel.

4. Specific Embodiments in the Drawings

The drawings presented herein are for illustrative purposes only and do not limit the scope of the disclosure.

Rather, the drawings are intended to help enable one having ordinary skill in the art to make and use the assemblies disclosed herein.

Although the methods, structures, elements, and parts described herein have been described in detail, it should be understood that various changes, substitutions, and alterations can be made without departing from the spirit and scope of the versions disclosed herein. Those skilled in the art may be able to study the preferred versions and identify other ways to practice versions disclosed herein that are not exactly as described herein. It is the intent of the applicant that variations and equivalents of the disclosed versions are within the scope of the disclosure, while the description, abstract and drawings are not to be used to limit the scope of the disclosure. The disclosed versions are specifically intended to be as broad as described below and their equivalents.

Figure 1:
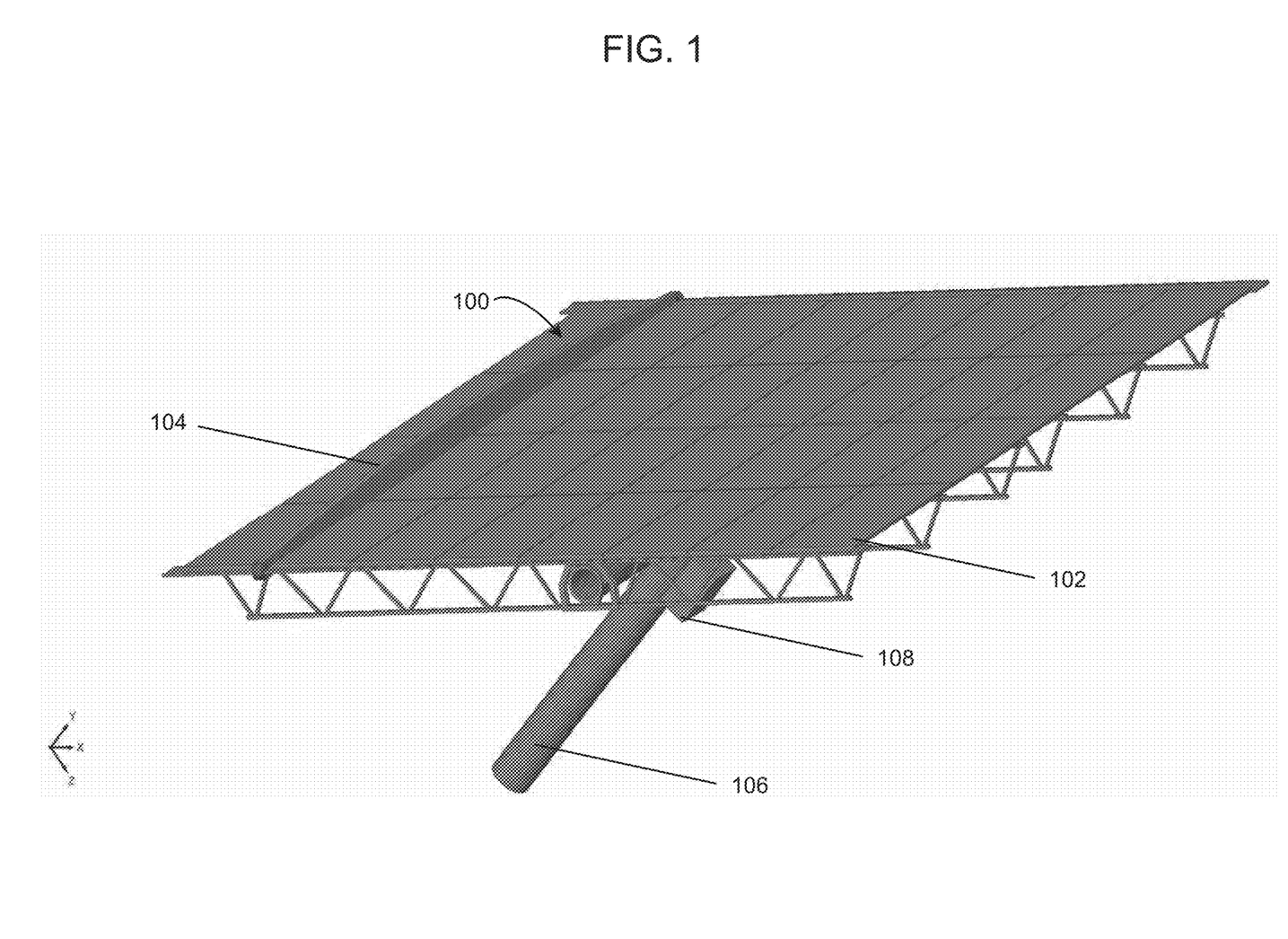
FIG. 1 illustrates a profile view of a cleaning assembly coupled to a photovoltaic panel.

FIG. 1 illustrates a profile view of a cleaning assembly 100 coupled to a photovoltaic panel 102. The cleaning assembly 100 may include a housing 104. The housing 104 may be disposed over a portion of the photovoltaic panel 102. The photovoltaic panel 102 may be coupled to a support stand 106. In various versions, components of the cleaning assembly 100 may be coupled to the photovoltaic panel 102 and/or the support stand 106. The cleaning assembly 100 may include a controller 108 and a two-way radio transceiver (not shown). The two-way radio transceiver is capable of sending and/or receiving a radio signal. Furthermore, upon receiving a radio signal, the two-way radio transceiver may transmit an electrical signal to the controller 108.

Figure 2:
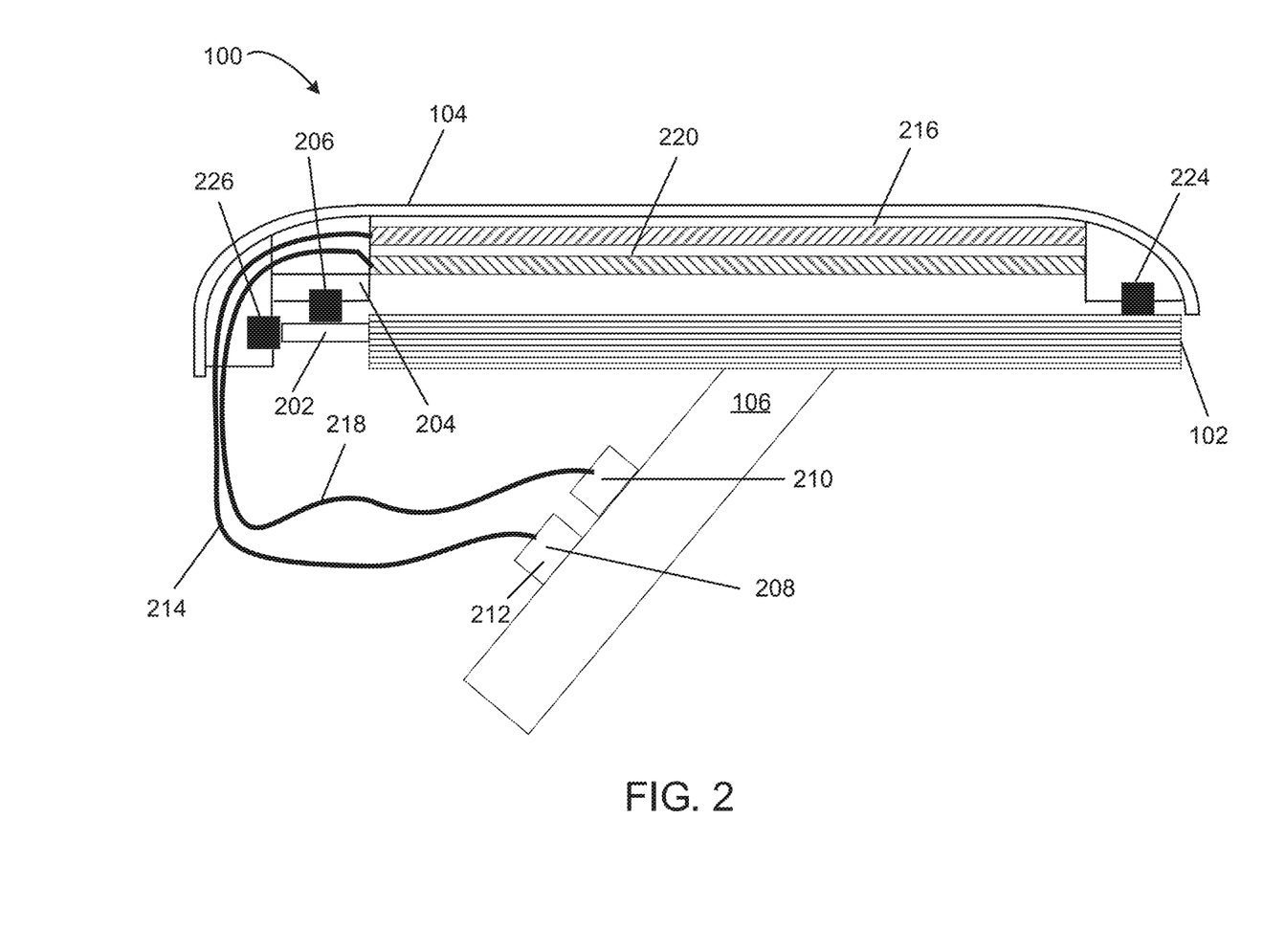
FIG. 2 illustrates a cross-sectional side view of a cleaning assembly.

FIG. 2 illustrates a cross-sectional side view of a cleaning assembly 100. The cleaning assembly 100 may include: a housing 104, a track 202, a motor 204, a drive wheel 206, a vacuum pump 208, and an air pump 210. The track 202 may be coupled to a photovoltaic panel 102. A portion of the track 202 may be extended away from an edge of the photovoltaic panel 102. The housing 104 may cover a portion of the track 202.

The drive wheel 206 may be disposed on the track 202. The drive wheel 206 may be rotatably coupled to the motor 204. When actuated, the motor 204 would cause the drive wheel 206 to rolled on the track 202.

The motor 204 may be coupled to the housing 104. The motor 204 may be disposed underneath the housing 104. Thus, when the motor 204 is actuated to cause the drive wheel 206 to be rolled on the track 202, the motor 204 and the housing 104 would be moved relative to the track 202.

The vacuum pump 208 may include vacuum motor 212, a vacuum conduit 214, and a suction head 216. The vacuum motor 212 may be coupled to a support stand 106. A vacuum conduit 214 may be in fluid communication with the vacuum motor 212. The vacuum conduit 214 may be in fluid communication with the suction head 216.

The suction head 216 may be coupled to the housing 104. In addition, the suction head 216 may be a tubular. Also, the suction head 216 may have apertures disposed therethrough.

The air pump 210 may include a pump conduit 218 and a nozzle 220. The nozzle may be disposed underneath the housing 104.

In addition, the cleaning assembly 100 may include support wheel 224 and a guide wheel 226. The support wheel 224 may be rotatably coupled to the housing 104. The guide wheel 226 may also be rotatably coupled to the housing 104. Moreover, the guide 226 wheel may be in physical contact with the track 202.

Figure 3:
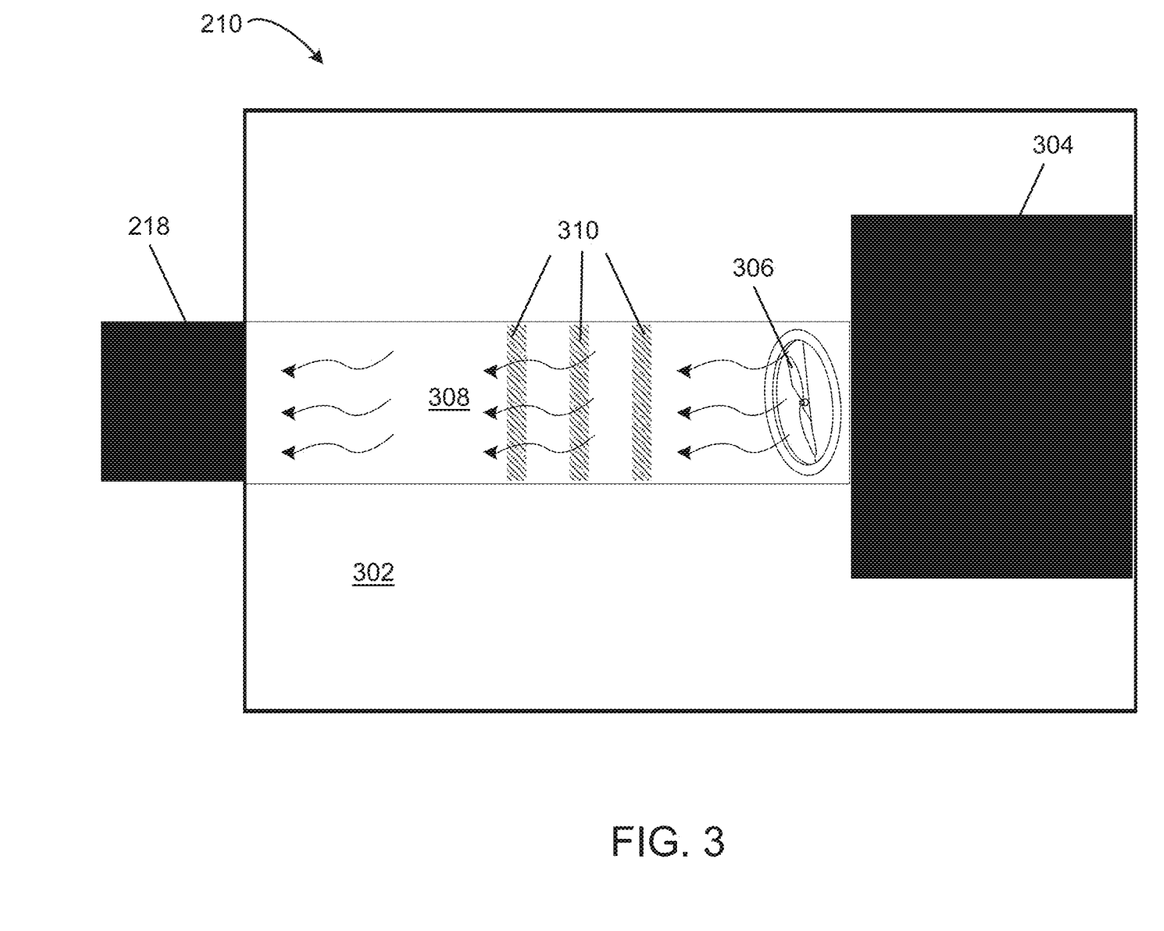
FIG. 3 illustrates a cross-sectional side view of an air pump.

FIG. 3 illustrates a cross-sectional side view of an air pump 210. The air pump 210 may include a pump housing 302, pump motor 304, a fan 306, a pump conduit 218, and a nozzle 220 (FIG. 2). The nozzle 220 may be coupled to the pump conduit 218. The pump conduit 218 may be fluidly coupled to the nozzle 220 and the pump housing 302. The pump housing 302 may be coupled to a support stand 106 (FIG. 2). Additionally, the pump housing 302 may have a fan aperture 308 disposed therethrough. The fan aperture 308 may be aligned with apertures extended through the pump conduit 218 and the nozzle 220. Thus, the fan aperture 308, the pump conduit 218, and the nozzle 220 may be fluidly connected.

Also, the pump motor 304 may be disposed in the pump housing 302. The fan 306 may be rotatably coupled to the pump motor 304. Accordingly, the fan 306 may cause a volume of air to be flowed through the fan aperture 308, the pump conduit 218, and the nozzle 220. The volume of air exiting the nozzle 220 may be directed towards a surface of a photovoltaic panel 102 (FIG. 2).

In addition, one or more ionizing electrodes 310 may be disposed in the fan aperture 308. The one or more ionizing electrodes 310 may be coupled to the pump housing 302. Air in the air pump 210 may be flowed across the one or more ionizing electrodes 310. Electrons emitted by the one or more ionizing electrodes 310 may be carried by the air.

Figure 4:
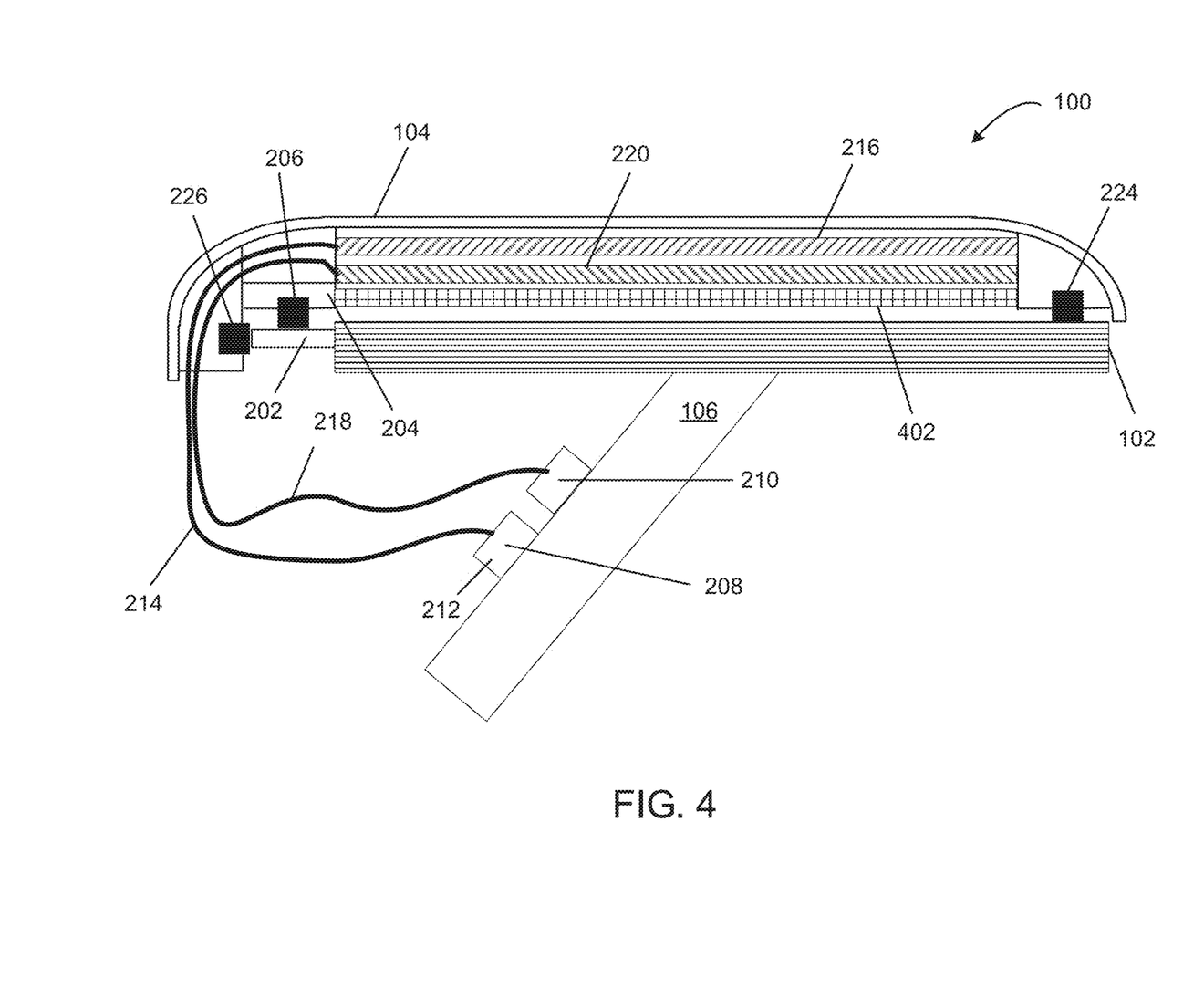
FIG. 4 illustrates a cross-sectional side view of a cleaning assembly that includes a brush.

FIG. 4 illustrates a cross-sectional side view of a cleaning assembly that includes a brush 402. The brush 402 may be rotatably coupled to a motor 204. In addition, the brush 402 may be rotatably coupled to the housing 104. When actuated, the motor 204 would cause the drive brush 402 to be rotated. The brush 402 may include bristles capable of physical contact with a photovoltaic panel 102.

Figure 5:
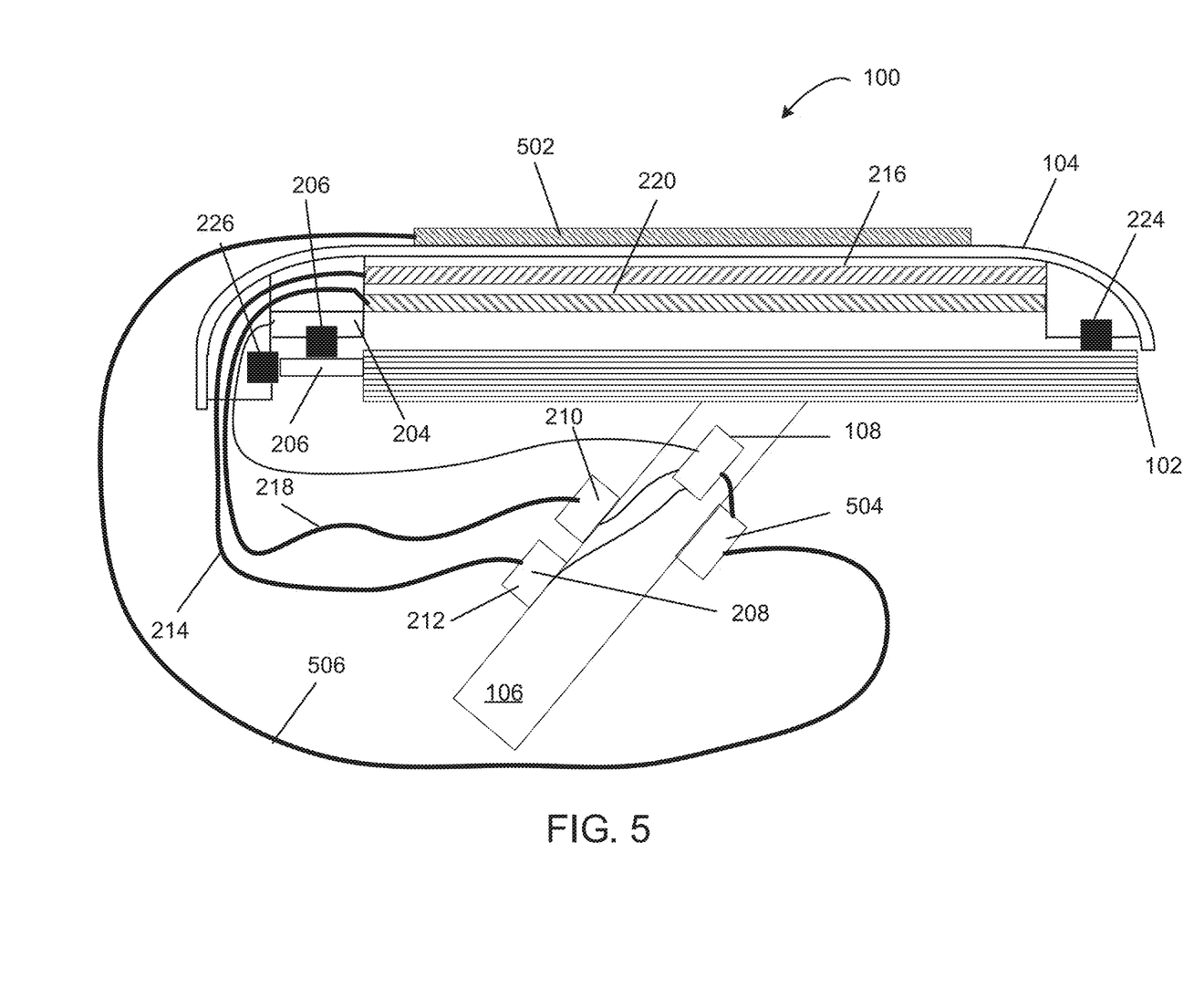
FIG. 5 illustrates a cross-sectional side view of a cleaning assembly that includes a photovoltaic panel coupled to a power supply.

FIG. 5 illustrates a cross-sectional side view of a cleaning assembly 100 that includes a recharge photovoltaic panel 502 coupled to a power supply 504. The recharge photovoltaic panel 204 may be couple to an outer surface of a housing 104 of the cleaning assembly 100. A conductive cable 506 may be coupled to the recharge photovoltaic panel 204 and the power supply 504. Thus, the recharge photovoltaic panel 204 may be electrically coupled to the power supply 504. The power supply 504 may be coupled to a support stand 106.

Additionally, the power supply 504 may be configured to store electrical energy transferred from the recharge photovoltaic panel 502.

Furthermore, a controller 108 may be electrically coupled to the power supply 504. The controller 108 may distribute electrical energy from the power supply 504 to various components of cleaning assembly 100. These components may include a motor 204, a vacuum pump 208, an air pump 210, ionizing electrodes 310 of the air pump 210, a sensor 602 (FIG. 6), and a two-way radio transceiver (not shown).

Figure 6:
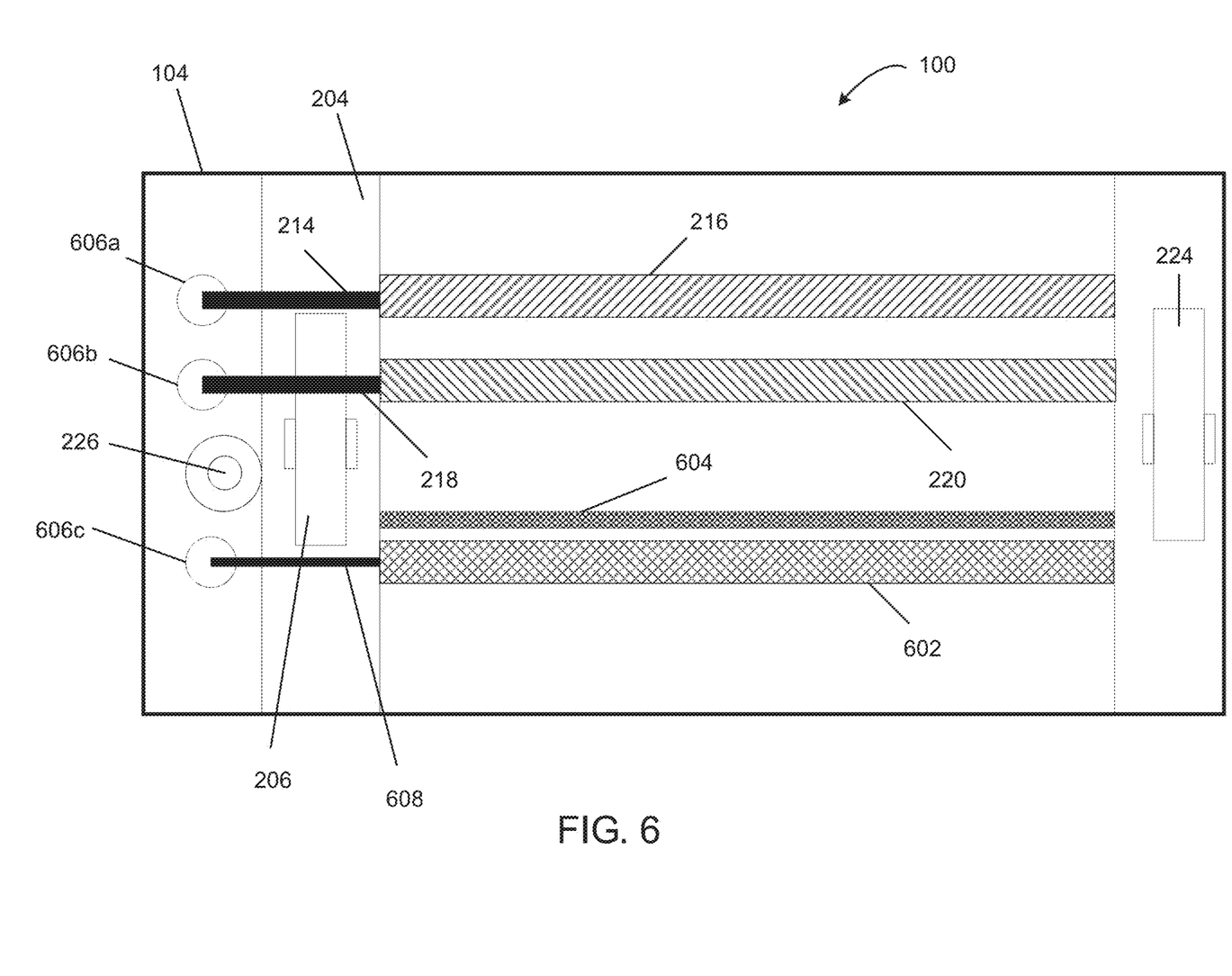
FIG. 6 illustrates a top plan view of a cleaning assembly.

FIG. 6 illustrates a top plan view of cleaning assembly 100. The cleaning assembly 100 may include: a housing 104, a motor 204, a drive wheel 206, a suction head 216, a nozzle 220, and sensor 602. The suction head 216 may be coupled to the housing 104. A vacuum conduit 214 may be fluidly coupled to the suction head 216. The vacuum conduit 214 may be extended through an aperture 606a disposed in the housing 104. The nozzle 220 may be coupled to the housing 104. A pump conduit 218 may be fluidly coupled to the nozzle 220. The pump conduit may be extended through an aperture 606b disposed in the housing 104. The sensor 602 may be coupled to the housing 104. A partition 604 may be disposed between the sensor 602 and the nozzle 220 and/or the vacuum 214. A power cable 608 may be electrically coupled to the sensor 602. The power cable 608 may be extended through an aperture 606b disposed in the housing 104. Additionally, the power cable 608 may be coupled a controller 108 (FIG. 5)

Prior to operation, an operator may couple an exemplary cleaning assembly 100 to a photovoltaic panel 102. Referring to FIGS. 1-6, the cleaning assembly 100 may include a controller 108, a first two-way radio transceiver (not shown), a housing 104, a track 202, a motor 204, a drive wheel 206, a vacuum pump 208, and an air pump 210. The cleaning assembly 100 may also include an ionizing electrode 310, a brush 402, and/or a sensor 602.

Later, the operator may use a second two-way radio transceiver (not shown) to send a radio signal from a remote location. The first two-way radio transceiver may receive the radio signal. Upon receiving the radio signal from the operator, the first two-way radio transceiver may transmit an electrical signal to the controller 108. The controller 108 may initiate several steps to clean the photovoltaic panel 102. First, the controller 108 may send an electrical signal to the air pump 210 to run. A fan 306 of the air pump 210 may turn to cause a first volume of air to flow through a fan aperture 308 of the air pump 210. In addition, the air pump 210 may cause ionizing electrodes 310 disposed in the fan aperture 308 of to emit negatively charged electrons. The electrons may bond with molecules of the first volume of air flowed through the fan aperture 308.

Accordingly, the air pump 210 may pump the electrically charged first volume of air through a pump conduit 218 and a nozzle 220 toward a surface of the photovoltaic panel 102. The negatively charged molecules or ions in the first volume of air may bond with positively charged particles between the housing 104 of the cleaning assembly 100 and the surface of the photovoltaic panel 102. These particles may include dust, dirt, debris, pollen, microorganisms, sediment, and/or bird droppings. Bonding with negatively charged molecules from the first volume of air may facilitate loosening or dislodging of the particles from the surface of the photovoltaic panel 102.

Also, the controller 108 may send an electrical signal to the vacuum pump 208 to run. The vacuum may suck (through a suction head 216 and a vacuum conduit 214) air and particles from under the housing 104 of the cleaning assembly 100. The vacuum pump 208 may direct the air and particles away from the photovoltaic panel 102.

Additionally, the controller 108 may send an electrical signal to the motor 204 to run. The running motor 204 may cause the drive wheel 206 to roll on the track 202 in a first direction.

Furthermore, the running motor 204 may cause the brush 402 coupled thereto to turn. The brush 402 may have bristles (not shown) being brushed against the photovoltaic panel 102 during operation.

Once the cleaning assembly 100 reaches an end of the track 202, the controller may then send an electrical signal to the motor to turn the drive wheel 206 in a second direction. The motor 204 may cause the drive wheel 206 to roll on the track 202 in a reverse direction. The controller 108 may send an electrical signal to the sensor 602 to scan one or more surface portions of the photovoltaic panel 102. The sensor 602 would send an electrical signal to the controller 108 if a defect, e.g., crack, chip, dent, or pit, is detected in or on the photovoltaic panel 102. The controller 108 may send to the operator a radio signal (via the first two-way radio transceiver) that includes data representing the defect. The data may include a unique identifier of the cleaning assembly and/or the photovoltaic panel 102. The data may include the defect type and/or global position location of the cleaning assembly 100.

Alternatively, a cleaning assembly 100 may be configured for automatic operation by a timer (not shown) coupled to a controller 108. The operator may configure the timer to transmit an electrical signal to the controller 108 to initiate steps to clean a photovoltaic panel 102. The timer may be set to send an electrical signal to the controller 108 in interval of minutes, hours, and/or days.

What is claimed as the invention is:

1. A method of cleaning a photovoltaic panel, comprising:
   providing a cleaning assembly comprising:
      a housing disposed adjacent a surface of the photovoltaic panel for cleaning;
      a drive motor coupled to the housing;
      a first wheel coupled to the drive motor;
      a second wheel coupled to the drive motor;
      a vacuum pump having a suction head disposed in the housing;
      an air pump having a nozzle disposed in the housing;
      an ionizing electrode coupled to the air pump;
      a sensor coupled to the housing;
      a power supply coupled to the drive motor; and
      a controller electrically coupled to the drive motor, the vacuum pump, the air pump, the ionizing electrode, and the power supply;
   disposing the first wheel and the second wheel on the photovoltaic panel;
   turning on the drive motor, the vacuum pump, and the air pump with the controller at a pre-determined time;
   rolling the first wheel and the second wheel on the photovoltaic panel in a first direction with the drive motor;
   generating a first volume of air with the air pump;
   ionizing the first volume of air with the ionizing electrode;
   blowing the ionized first volume of air through the nozzle against the photovoltaic panel with the air pump; and
   sucking a portion of the ionized first volume of air and debris in the housing out of the housing through the suction head with the vacuum pump;
   scanning, with the sensor, a portion of the surface of the photovoltaic panel; and
   transmitting a signal representing the scanned portion of the surface.

* * * * *